UNITED STATES PATENT OFFICE.

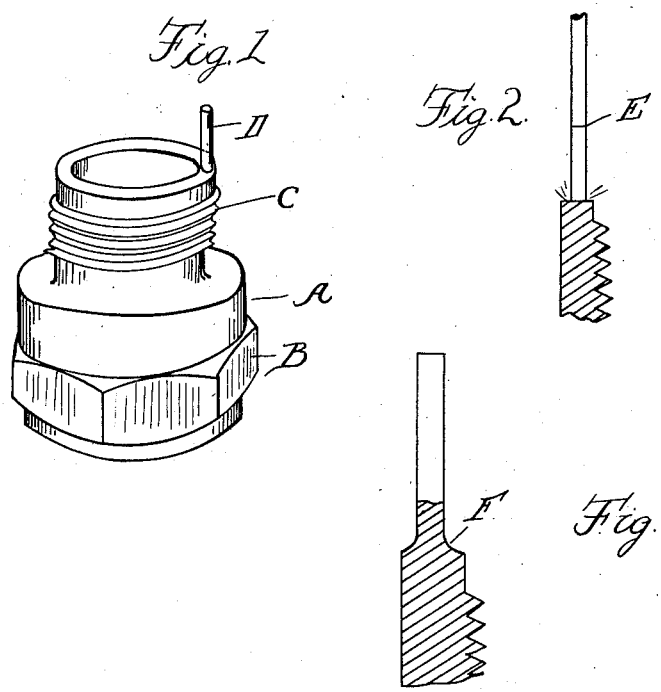

ALBERT SCHMIDT, OF FLINT, MICHIGAN, ASSIGNOR TO CHAMPION IGNITION COMPANY, OF FLINT, MICHIGAN, A CORPORATION OF MICHIGAN.

SPARK-PLUG.

1,319,423.       Specification of Letters Patent.       Patented Oct. 21, 1919.

Application filed March 8, 1917. Serial No. 153,234,

*To all whom it may concern:*

Be it known that I, ALBERT SCHMIDT, a citizen of the Republic of France, residing at Flint, in the county of Genesee and State of Michigan, have invented certain new and useful Improvements in Spark-Plugs, of which the following is a specification, reference being had therein to the accompanying drawings.

The invention relates to spark-plugs, and has more particular reference to the means of attaching the grounded electrode to the plug casing. In the present state of the art it is usual to form the plug casings with a threaded nipple for engagement with the engine casing and to attach the electrode thereto by drilling into the end of the cylindrical shell of the nipple and inserting a wire electrode therein. The operation of drilling is one requiring considerable time with the frequent breaking of drills, and after the holes have been formed the electrodes must be engaged therewith and secured to form both an electrical and mechanical joint. Thus the cost of attaching the electrode is a considerable item.

With the present construction I have dispensed with the necessity of drilling and have obtained a better mechanical and electrical connection, by electrically welding the inner end of the electrode to the casing shell.

In the drawings:

Figure 1 is a perspective view of the completed structure;

Fig. 2 is a section showing the manner of forming the weld; and

Fig. 3 is a similar view of the completed weld.

A is the spark-plug casing, which is provided with a polygonal section B and a threaded nipple section C at the inner end thereof. This nipple section is in the form of a cylindrical shell having comparatively thin walls. D is the electrode, which as shown is in the form of a wire of round cross-section, but which may be of any suitable shape.

To unite the electrode to the casing shell the end of the wire, preferably before severance from the stock, is placed in contact with a segment of the nipple shell, as shown in Fig. 2, and engaged with the electrodes of a suitable welding apparatus by which current is passed therethrough. The point of contact with the shell being of greatest resistance, heat will be developed, and by reason of the fact that the wall of the shell is comparatively thin a welding heat may be produced therein without overheating the electrode. This is also facilitated by leaving the electrode integral with the stock so that heat will be dissipated therethrough, and by subsequently severing, as indicated at E Fig. 2. The process by which this is accomplished is not, however, part of the present invention and therefore will not be described in detail.

In forming the welded joint as just described, the inner end portion of the electrode will be slightly upset or enlarged, due to fusion and pressure, as indicated at F, thereby forming a strong mechanical and good electrical connection. Also by thus integrating the metal of the electrode with that of the casing the heat of the electrode is more rapidly dissipated, which insures a longer life.

What I claim as my invention is:

1. The combination with a cylindrical shell, of a metallic member projecting from said shell and having its inner end butt-welded thereto.

2. The combination with a cylindrical shell of a spark-plug casing, of an electrode projecting from a segment of said shell having its inner end butt-welded thereto.

3. The combination with a spark-plug casing having a threaded nipple terminating in a comparatively thin-walled shell, of an electrode butted against the thin wall of said shell and welded thereto.

4. The combination with a spark-plug casing having a threaded nipple terminating in a comparatively thin-walled shell, of an electrode butted against said shell and welded thereto, the welded end being slightly upset and enlarged to form a firm mechanical and a good electrical and heat-conducting joint.

5. The combination with a spark-plug casing, of an electrode welded to said casing and molecularly integrated therewith to form high thermal and electrical conductivity therebetween.

In testimony whereof I affix my signature.

ALBERT SCHMIDT.